Feb. 15, 1927.

L. H. OBERREICH 1,617,540

ABNORMAL TEMPERATURE ALARM

Filed April 4, 1925

INVENTOR.
LOUIE H. OBERREICH,

BY

ATTORNEY.

Patented Feb. 15, 1927.

1,617,540

UNITED STATES PATENT OFFICE.

LOUIE H. OBERREICH, OF INDIANAPOLIS, INDIANA.

ABNORMAL TEMPERATURE ALARM.

Application filed April 4, 1925. Serial No. 20,673.

It is the object of my invention to produce an audible temperature alarm which will be positive in operation, which when once started will continue to operate even though its temperature fall considerably below that which is necessary to start the alarm, which will reset itself, and which may be easily and cheaply constructed. This aspect of my invention is particularly concerned with an improved form of release mechanism which in conjunction with alarm mechanism and temperature responsive means will accomplish the objects above set forth but which, as will be evident, may be applied otherwise than in temperature alarms. A further object of my invention is to provide such a device having a coil-spring motor with a signal which will give a visible indication when the spring requires rewinding.

I accomplish the above objects by providing a bell with a tapper actuated by clockwork mechanism, and I provide this clockwork mechanism with a thermostatically controlled stop which when once disengaged to permit the operation of the clockwork mechanism will remain out of engagement until reset by the thermostat at a lower temperature than that necessary to cause disengagement. To provide means for indicating that the coil-spring of the clockwork mechanism requires rewinding, I include in my device a pivoted lever provided with an arm bearing against a coil of the spring, so that the position of this arm will vary with the position of the spring-turn with which it is in engagement and will give a visible indication of the condition of the spring.

Figure 1:
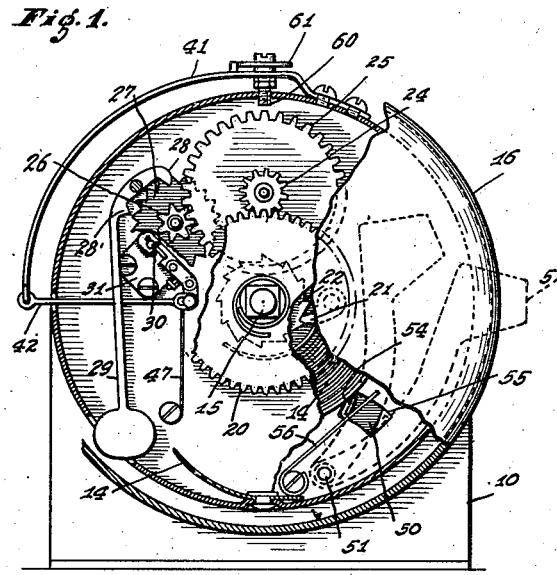
Figure 2:
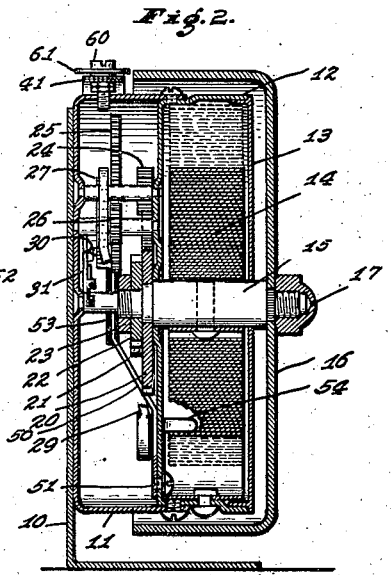
Figure 3:
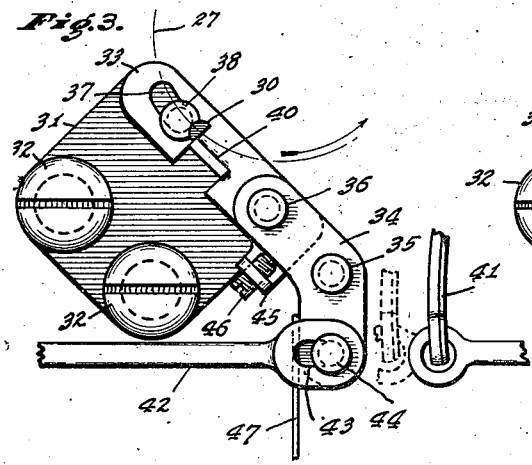
Figure 4:
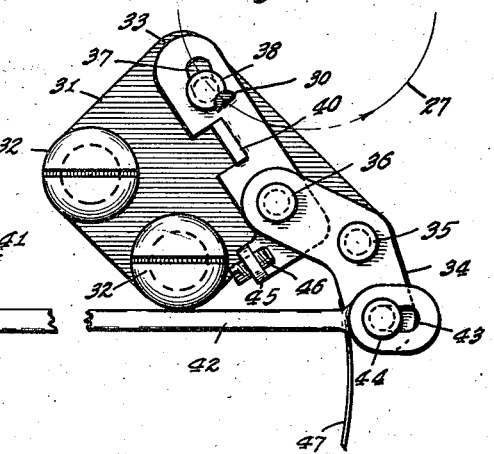
Figure 5:
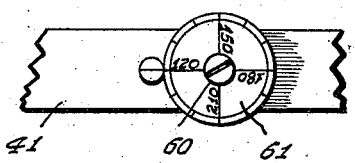

The accompanying drawing illustrates my invention:—Fig. 1 is a front elevation of my device with same of the parts broken away to more clearly show their construction; Fig. 2 is a vertical section through the casing and bell showing the parts of the clockwork mechanism; Figs. 3 and 4 are detail views on an enlarged scale showing the construction of the release mechanism and its associated parts; and Fig. 5 is a fragmental plan view showing the means provided for adjusting the thermostatic element to vary the temperature at which the alarm will operate.

My device includes a supporting member 10 to which is affixed a circular casing 11 from which is supported a spring-casing 12 provided with a cover 13. A coil spring 14 is mounted within the spring-casing 12, the outer end of such spring being fastened to the spring-casing 12 and the inner end to a shaft 15 which extends into the casing 11. A bell 16 is secured to the outer end of the shaft 15 by a nut 17, the outer end of the shaft 15 preferably being provided with a squared portion which enters a square hole in the bell.

Rotatably mounted on the shaft 15 within the casing 11 is a gear 20 which carries a pawl 21 arranged to engage the teeth of a ratchet 22 which is rigidly mounted on the shaft 15 by means of a nut 23. The gear 20 meshes with a small pinion 24 rigidly attached to a gear 25 which in turn meshes with the escapement pinion 26. Rotatable with the pinion 26 is the escape wheel 27 provided with a peripheral series of teeth which engage the teeth 28 and 28' of the pivotally mounted bell tapper 29. As the escape wheel 27 rotates, it oscillates the bell-tapper 29 to ring the bell. Rotation of the escape wheel 27 is normally prevented by a pin 30 mounted on such escape wheel in position to co-operate with my improved release mechanism.

This release mechanism is shown in detail in Figs. 3 and 4. It comprises a base plate 31 mounted on the casing 11 by means of screws 32, which base plate serves to support a pair of levers 33 and 34 which form a toggle. The lever 34 is pivoted to the base plate 31 by a pin 35 and is pivotally connected to the lever 33 by a pin 36. The lever 33 is provided with a slot 37 for the reception of a pin 38 on the base plate 31. The lever 33 carries a stop 40 which normally lies in the path of the pin 30 and which when engaged by the pin 30 as shown in Fig. 3 prevents rotation of the escape wheel 27.

A thermostatic element, such as a bimetallic strip 41 is connected by a link 42 with the lever 34, the link 42 being provided with a slot 43 which engages a pin 44 mounted on the lever 34. To adjust the toggle formed by the links 33 and 34 so that the release mechanism will be most sensitive, I provide the lever 33 with an up-turned ear 45 which carries an adjusting screw 46 bearing against the side of the lever 34. This screw is so adjusted as to bring the pin 36 in substantial alinement with the pins 35 and 38 when the release mechanism is set to prevent rotation of the escape wheel 27. Preferably, I provide a spring such as the leaf spring 47, which bears against the lever 34 and serves to open the toggle and release the pin 30 upon the slightest movement of the pin 36 to the left and downward from the position shown in Fig. 3. The spring 47 exerts but slight pressure on the lever 34 so that with the toggle set in the position shown in Fig. 3 the pressure exerted by the spring 47 is insufficient to open the toggle against the friction between the pin 30 and the stop 40.

As shown in Fig. 3, the parts are in the position occupied when the alarm is subjected to a relatively low temperature. As the temperature increases the lower end of the thermostatic element 41 moves to the right from the dotted line position indicated in Fig. 4; and when this movement becomes sufficient, the end of the slot 43 engages the pin 44 and moves the lower end of the lever 34 to the right. This operation moves the pin 36 to the left and downward, disengages the stop 40 from the pin 30, and permits rotation of the escape wheel 27 and the consequent sounding of the alarm. The spring 47 assists in opening the toggle, and, after it is once opened, this spring serves to hold it open until it is definitely re-set by the thermostatic elements moving the lever 42 to the left to the position shown in Fig. 3. Thus, the alarm will continue to ring until the thermostatic element has cooled to a temperature considerably below that necessary to release the stop 40 from the pin 30.

Pivotally mounted on the back of the spring casing 12 is the signal for indicating when the spring 14 is run down. This signal comprises an arm 50 pivotally supported near one end as by a screw 51. At the opposite end, the arm 50 has a laterally extending portion 52 which may project through a slot 53 in the side of the casing 11 when the arm 51 is moved to the right. Rigid with the arm 50 is a finger 54 which projects through a slot 55 in the base of the spring casing 12 and bears against one of the turns—preferably the outer turn—of the coil spring 14, the finger 54 being held in engagement with the spring-turn by means of a spring 56. As the spring runs down, its coils expand, and the outer coil forces the arm 50 to the right (Fig. 1), the arm 50 being so arranged that the enlarged portion 52 becomes visible beyond the side of the bell 16 before the spring 14 has reached the limit of its expansion. The enlarged portion 52, therefore, serves as a visible signal giving an indication when the spring 14 requires rewinding.

Desirably, some means is provided for adjusting the temperature at which the release mechanism is actuated to set the alarm in operation. Such an adjustment may be obtained by the screw 60 which passes through the thermostatic element 41 and into the casing 11. This screw 60 may be provided with a graduated head 61 to indicate the temperature at which the alarm will be set in operation. By virtue of the slot 45 in the link 42, adjustment of the screw 60 to lower the temperature at which the alarm will be set in operation does not actuate the release mechanism.

With the thermostat 41 adjusted as desired by the screw 60, the alarm may be placed in the desired location. As the temperature rises, the lower end of the thermostatic element 41 moves to the right carrying the link 42 with it. When a temperature is reached corresponding to the setting of the screw 60, the end of the slot 43 will engage the pin 44 and move the lower end of the lever 34 to the right. As above described, this movement will disengage the stop 40 from the pin 30 and permit operation of the alarm, the spring 47 serving to hold the stop 40 out of engagement with the pin 30 until the release mechanism is reset by movement of the thermostatic element 41 to the left. This resetting of the release mechanism does not occur until the thermostatic element 41 has cooled to a temperature considerably lower than that necessary to actuate the release mechanism. Thus, the alarm is not affected by small fluctuations in temperature.

As the alarm operates, the spring 13 unwinds and forces the arm 50 outward until the enlarged portion 52 comes into view beyond the rim of the bell 12. The appearance of the arm-enlargement 52 is an indication that the spring should be rewound, and this rewinding may be easily accomplished by rotation of the bell 12.

I claim—

1. In combination with a temperature alarm, a re-settable release mechanism effective when actuated to initiate the operation of said alarm and when re-set to stop said operation, and a temperature-responsive device for actuating said release mechanism at a predetermined temperature and for re-setting said release mechanism only at a lower temperature.

2. The combination set forth in claim 1, with the addition of means tending to prevent the re-setting of said release mechanism until said release mechanism is definitely re-set by said temperature-responsive device.

3. In combination with a temperature alarm, a re-settable release mechanism effective when actuated to initiate the operation of said alarm and when re-set to stop said operation, a temperature-responsive device for actuating said release mechanism at a predetermined temperature, and means for preventing the re-setting of said release mechanism except at a different temperature from that necessary to cause its actuation.

4. In combination with a temperature alarm, a re-settable release mechanism effective when actuated to initiate the operation of said alarm and when re-set to stop said operation, a temperature-responsive device for actuating and resetting said release mechanism and a lost-motion connection between said temperature-responsive device and said release mechanism.

5. The combination set forth in claim 4, with the addition of means tending to prevent the re-setting of said release mechanism until said release mechanism is definitely re-set by said temperature-responsive device.

6. A release mechanism for alarms, comprising a base, a pair of levers pivotally connected together and pivotally supported from said base, an abutment on one of said levers adapted to engage a moving part of said alarm to prevent operation of said alarm when said two levers are arranged with their pivotal connection substantially in line with their points of pivotal attachment to said base, and means for moving said levers to disengage said abutment and permit operation of said alarm.

7. The combination set forth in claim 6, with the addition of an adjustable stop on one of said levers adapted to engage the other of said levers to limit relative rotation of said levers in one direction about their axis of pivotal connection.

8. In a temperature alarm, a release mechanism, a temperature-responsive device for actuating and resetting said release mechanism, a lost-motion connection between said temperature-responsive device and said release mechanism, and means for adjusting said temperature responsive device to vary the temperature at which said release mechanism will be actuated.

In witness whereof, I have hereunto set my hand at Indianapolis, Indiana, this 1st day of April, A. D. one thousand nine hundred and twenty five.

LOUIE H. OBERREICH.